Figure 1:
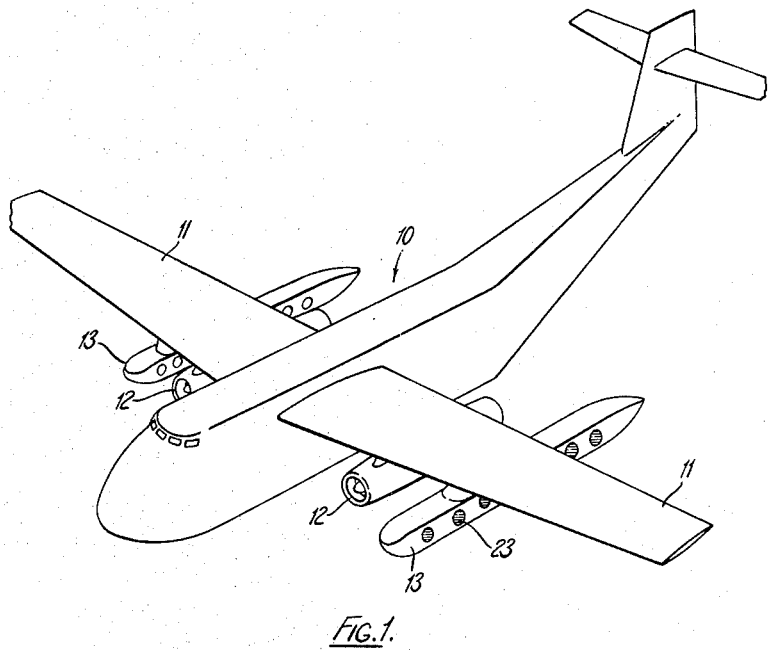

Aug. 17, 1965  E. E. CHILVERS  3,201,070
MOUNTING OF GAS TURBINE ENGINES
Filed April 29, 1963  2 Sheets-Sheet 1

Inventor
Ernest Edward Chilvers

By
Fred L. Witherspoon Jr. &
Fred. E. Shoemaker  Attorneys

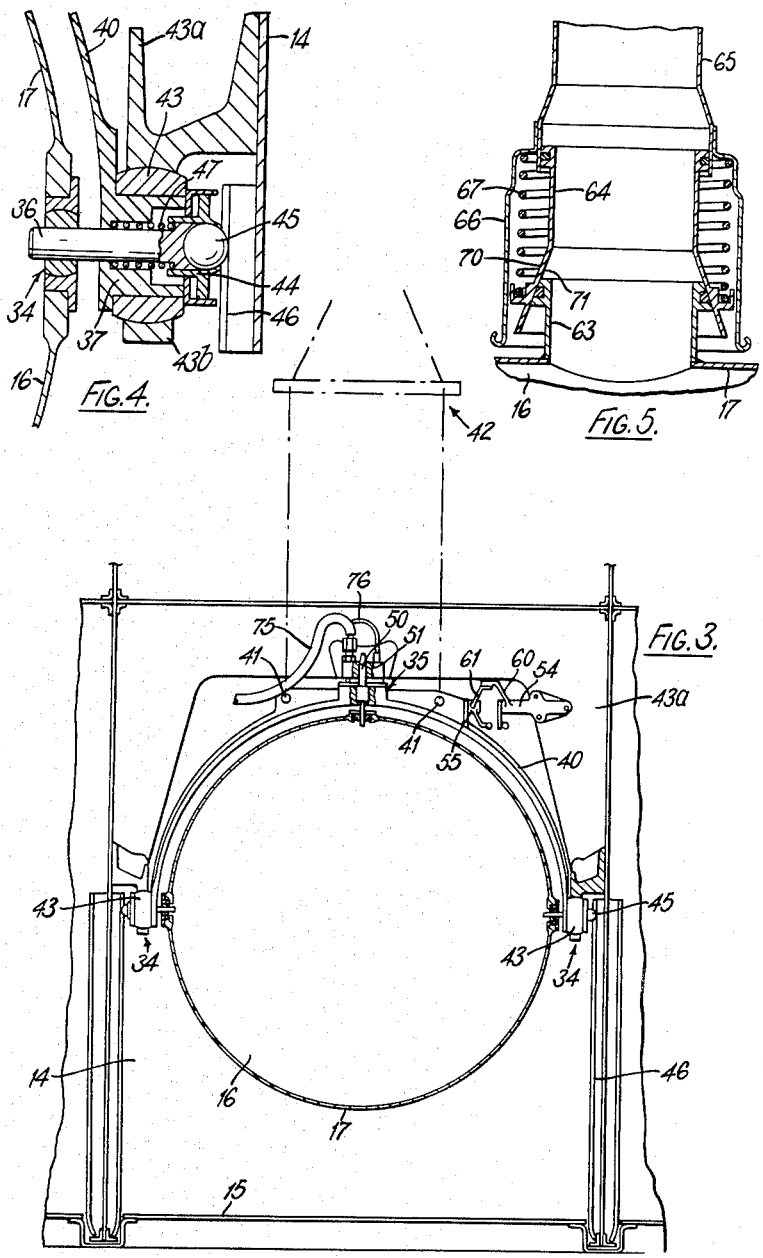

:::
United States Patent Office 3,201,070
Patented Aug. 17, 1965

3,201,070
MOUNTING OF GAS TURBINE ENGINES
Ernest Edward Chilvers, Duffield, Derby, England, assignor to Rolls-Royce Limited, Derby, England, a company of Great Britain
Filed Apr. 29, 1963, Ser. No. 276,639
14 Claims. (Cl. 244—54)

This invention concerns improvements relating to the mounting of gas turbine engines.

According to the present invention there is provided an installation comprising a gas turbine engine mounted in an engine bay, a fuel conduit through which fuel may be supplied to the engine, and fuel supply control means for controlling the amount of fuel passing through the said conduit to the engine, said conduit and said fuel supply control means each being constituted by at least two mutually co-operating parts which are respectively mounted on the engine (or on means secured thereto) and in the engine bay, the engagement of said mutually co-operating parts constituting the sole means for operatively joining said parts when the engine is correctly installed in the engine bay. It should be noted that the mutually cooperating parts are retained in position due to the fact that the engine is secured in the engine bay.

The said mutually co-operating parts of the fuel supply control means are preferably respectively constituted by two parts of a linkage, said linkage itself forming a part of the said fuel supply control means. Thus the linkage may include two pivoted members which are respectively pivotally mounted on the engine (or on means secured thereto) and in the engine bay, the pivoted members contacting each other, when the engine is correctly installed, in such a way that pivotal movement of one of the pivoted members causes pivotal movement of the other pivoted member.

The said mutually co-operating parts of the said fuel conduit are preferably provided with mutually engageable conical surfaces which are resiliently urged towards one another.

Preferably at least one air conduit and/or oil supply conduit and/or oil scavenge conduit is provided one part of which is mounted in the engine bay and the other part of which is mounted on the engine and is adapted to communicate with a portion of the engine, the said parts of the said conduit being such and being so arranged that they are automatically brought into operative engagement with each other when the engine is correctly installed in the engine bay. The parts of each said conduit preferably have internally engageable conical surfaces which are resiliently urged towards one another.

One such air conduit may be provided to supply air to effect starting of the engine turbine, another may be provided to withdraw from the engine air which has been compressed therein, and yet another may be provided to communicate with the downstream end of the engine compressor for taking an air tapping for aircraft control purposes.

There may be at least one electrical lead one part of which is mounted on the engine and the other part of which is mounted in the engine bay, the two parts of the said electrical lead being automatically connected together when the engine is correctly installed in the engine bay.

The engine is preferably supported in the engine bay by at least one trunnion, said trunnion comprising a pin having one end mounted on the engine and a spherical bearing member which is mounted in the engine bay and in which the other end of the pin is received, the spherical bearing member being retained in fixed structure by a plurality of separable parts to permit removal of the pivot therefrom, and means being provided for clamping said separable parts together. Means are also preferably provided for guiding the pin and the spherical bearing member towards the said separable parts during the installation of the engine in the engine bay.

The front of the engine preferably communicates with an intake member which is pivotally mounted in the engine bay, the intake member being pivotable to a position in which the engine may be removed from the engine bay.

The engine preferably has an exhaust duct which is mounted in the engine bay, releasable means being provided for securing the exhaust duct to the remaining part of the engine when the latter has been installed in the engine bay.

The invention also comprises an aircraft provided with a pod having a plurality of engine bays therein within each of which is mounted a gas turbine engine which extends transversely of the aircraft and which is provided with means whereby its jet gases may be selectively directed forwardly, rearwardly or downwardly, each said gas turbine engine forming part of an installation as set forth above.

Figure 2:
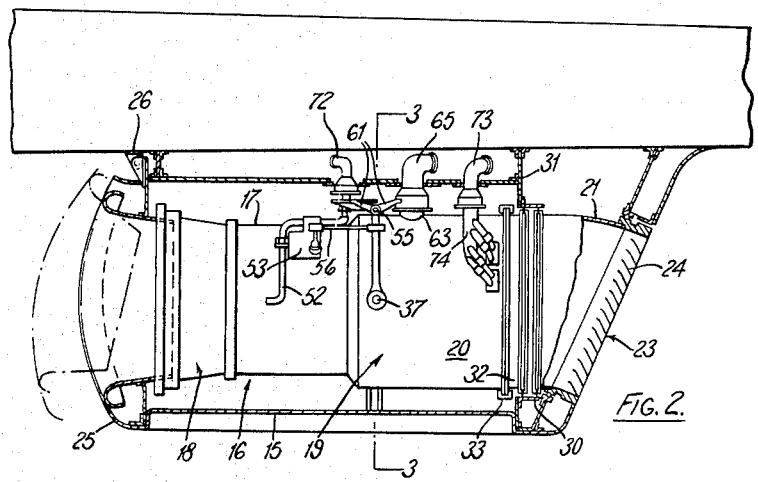

The invention is illustrated, merely by way of example, in the accompanying drawings, in which:

FIGURE 1 is a perspective view of an aircraft provided with two pods, each pod having a plurality of engine bays in each of which is installed a gas turbine engine, FIGURE 2 is a side view, partly in section, of one of the said gas turbine engines installed in its engine bay, FIGURE 3 is a section taken on the line 3—3 of FIGURE 2, and FIGURES 4 and 5 are sections illustrating part of the structure shown in FIGURES 3 and 2 respectively on a larger scale.

Referring to the drawings, an aircraft 10 has wings 11 each of which carries pods 12, 13. Mounted in each of the pods 12 is a gas turbine forward propulsion engine.

Each of the pods 13 is provided with a plurality of engine bays 14 (best seen in FIG. 3), the bottom of each engine bay 14 being closed by a removable plate 15. Mounted in each of the engine bays 14, so as to extend transversely of the aircraft 10, is a gas turbine engine 16 which may be used, as required, either as a vertical lift or as a forward propulsion engine.

Each of the engines 16 has an engine casing 17 within which are mounted in flow series a compressor 18, combustion equipment 19, and a turbine 20, the turbine exhaust gases being directed to atmosphere through an exhaust duct 21.

The downstream end of the exhaust duct 21 of each of the engines 16 is provided with a rotatably mounted nozzle 23. Each nozzle 23 has guide vanes 24 which are such that the nozzle 23 may be rotated, as desired, into positions in which the turbine exhaust gases are respectively directed in forward, rearward, and downward directions. The necessary mechanisms (not shown) for effecting such rotation of the nozzles 23 may be mounted within the engine bays 14.

An intake member 25 is mounted in each of the engine bays 14 in a pivot 26. Each intake member 25 is pivotable between an operative position (shown in full lines in FIG. 2) in which it communicates with the engine 16, and an inoperative position (shown in dotted lines in FIG. 2) in which the respective engine 16 may be removed from the engine bay 14.

The exhaust duct 21 of each engine 16 is slidably mounted and sealed within an annular member 30 which is secured in position within the respective engine bay 14 by a bracket 31. Slidably mounted and sealed within the said annular member 30 is one end of a casing section 32. A two-part annular member 33 is employed to clamp together adjacent flanges on the engine casing 17 and casing sections 32. The two parts of the annular member 33 are pivoted to each other (by means not shown) and may be separated to permit the engine 16 to be removed from the engine bay 14, bolts or the like (not shown) being provided for normally securing the said two parts together.

Each engine 16 is located in its engine bay 14 by two diametrically oppositely disposed trunnions 34 and by a trunnion 35.

Each of the trunnions 34 comprises a pin 36 (FIG. 4) which has one end mounted in the engine casing 17 and which slidably extends through a hole in a boss 37. The bosses 37 of the two trunnions 34 are provided on a common yoke member 40, the latter being provided with a pair of eyes 41 (FIG. 3) to permit the engine 16 to be lifted by a sling 42.

Each of the bosses 37 is mounted within a spherical bearing member 43 which is retained in a member 43a. The member 43a bridges the yoke member 40 and is secured to the walls of the engine bay 14. The member 43a, in the region of each spherical bearing member 43, is provided with a cap 43b which is pivoted (by means not shown) to the member 43a. Each cap 43b may be moved to a position in which the respective spherical bearing member 43 and boss 37 may be removed from the member 43a, bolts or other means (not shown) being provided for clamping the cap 43b and the member 43a together.

Each pin 36 is provided with a cup 44 within which is mounted a ball 45, the ball 45 engaging a vertically extending track 46 mounted in the engine bay 14. A spring 47, which is mounted within a recesss in the respective boss 37, engages the respective cup 44 so as to urge the respective ball 45 into its track 46.

The tracks 46 are so disposed that, during the installation of an engine 16, they guide the pins 36, bosses 37, and spherical bearing members 43 towards the member 43a so as to ensure that they are properly located with respect to the latter.

The trunnion 35 of each engine 16 comprises a pivot pin 50 which is mounted in the engine casing 17 and extends through an opening in the yoke member 40, the pivot pin 50 extending into an annular bearing member 51 slidably mounted in the respective engine bay 14.

Mounted on each engine 16 is a fuel conduit 52 for the supply of fuel to the combustion equipment 19, the flow of fuel through the fuel conduit 52 being controlled by a fuel control unit 53 which is mounted on the engine 16. The fuel control unit 53 includes a metering orifice (not shown) whose size is varied (by means not shown) in dependence upon the value of engine variables such as engine rotational speed and compressor pressures. The size of the said metering orifice is also controlled from a pilot's throttle lever (not shown) by way of a linkage which includes a pivoted member 54 (FIG. 3), a pivoted member 55, and a link 56 (FIG. 2) which is connected to the pivoted member 55 and to the fuel control unit 53.

The pivoted member 54 is pivotally mounted in the engine bay 14 while the pivoted member 55 is pivotally mounted on the yoke member 40. The pivoted member 54 has a pair of arms 60 which contact a pair of arms 61 on the pivoted member 55, the arrangement being such that pivotal movement of the pivoted member 54 by the pilot's throttle lever causes like pivotal movement of the pivoted member 55 and hence adjustment of the size of the said metering orifice. The arrangement is also such that the arms 60, 61 are brought into the correct operative engagement with each other merely by the correct positioning of the engine 16 within the engine bay 14, there being no need to secure these arms together.

An air bleed conduit has a portion 63 (FIG. 5) which is adapted to be supplied with air compressed in the compressor 18, an intermediate portion 64, and a portion 65 for conducting the air to a point of use on the aircraft 10—e.g. for pitch and yaw control.

The portion 65 has a skirt 66 within which is mounted a spring 67. The spring 67 engages the portion 64 so as to urge a conical internal surface 70 of the portion 64 into sealing engagement with a conical external surface 71 on the portion 63. The portions 63–65 are so arranged that they will be automatically coupled to each other when the engine 16 is correctly installed, no bolting of these portions together being necessary.

Mounted in each engine bay 14 is a fuel conduit 72 which is connected to a fuel tank (not shown), the engine bay 14 also being provided with an oil supply conduit (not shown). The fuel conduit 72 is connected to the fuel conduit 52 (and the said oil supply conduit is connected to an oil supply line, not shown, on the respective engine) by means of parts which are not shown but which correspond to the parts 64, 67, 70, 71.

Also mounted in each engine bay 14 is an air conduit 73 which is connected to an air conduit 74 on the respective engine 16 by means of parts which are not shown but which correspond to the parts 64, 67, 70, 71. Air may be supplied from a source (not shown) and through the air conduits 73, 74 so as to effect starting of the turbine 20.

The relative disposition of the fuel conduits 52, 72 and of the air conduits 73, 74 is such that they are automatically connected to each other when the engine 16 is correctly installed in the engine bay 14.

A self-sealing conduit 75 (FIG. 3) is provided for taking a tapping (for aircraft control purposes) from the downstream end of the compressor 18. The conduit 75 includes two parts (not shown) which are respectively mounted on the engine 16 and in the engine bay 14 and which may be automatically coupled together.

An electrical lead 76 is provided for supplying electrical current to an igniter (not shown) which forms part of the combustion equipment 19 of each of the engines 16. The electrical lead 76 includes two parts (not shown) which are respectively mounted on the engine 16 and in the engine bay 14 and which are automatically connected together by a quick release plug and socket connection (not shown).

The invention permits an engine 16 to be very easily installed in and removed from its engine bay 14.

Thus if it is desired to remove the engine, all that is necessary is to connect the sling 42 to a lifting tackle, pass it through an appropriate opening in the top of the engine bay 14 and connect it to yoke member 40, remove the plate 15, pivot the intake member 25 to the position shown in dotted lines in FIG. 2; unbolt and separate the parts of the annular members 33 and of the caps 43b, and lower the engine 16 out of the bay 14.

Re-installation of the engine 16 may be effected merely by engaging the balls 45 in the tracks 46, raising the engine by the sling 42, pivoting the intake member 25 into the full line position shown in FIG. 2, bolting together the parts of the annular member 33 and of the members 43a, 43b, removing the sling 42, and connecting the plate 15 in position.

When the engine 16 is so installed, the pivoted members 54, 55 will automatically be in operative engagement with each other, the fuel conduit 52 and the said oil supply conduit will be automatically coupled to the fuel conduit 72 and the said oil supply line respectively, the air bleed conduit portions 63–65 will be automatically coupled together, the air conduits 73, 74 will be automatically connected together, and the parts of the conduit 75 and electrical leads will likewise automatically be coupled together.

I claim:

1. An installation comprising an engine bay, a gas turbine engine mounted in the engine bay, a fuel conduit through which fuel may be supplied to the engine, and fuel supply control means for controlling the amount of fuel passing through the said conduit to the engine, said conduit and said fuel supply control means each being constituted by at least two mutually co-operating parts which are respectively mounted on the engine and in the engine bay, the engagement of said parts of the fuel conduit and the positioning of the parts of the fuel supply control means constituting the sole means for operatively joining said parts when the engine is correctly installed in the engine bay.

2. An installation comprising and engine bay, a gas turbine engine mounted in the engine bay, a fuel conduit through which fuel may be supplied to the engine, and fuel supply control means for controlling the amount of fuel passing through the said conduit to the engine, said conduit being constituted by at least two mutually co-operating parts which are respectively mounted on the engine and in the engine bay, the engagement of said parts of the fuel conduit constituting the sole means for operatively joining said parts when the engine is correctly installed in the engine bay, and said fuel supply control means comprising a linkage which includes two pivoted members which are respectively pivotally mounted on the engine and in the engine bay, the pivoted members contacting each other, when the engine is correctly installed, in such a way that pivotal movement of one of the pivoted members causes pivotal movement of the other pivoted member.

3. An installation as claimed in claim 2 in which the said mutually co-operating parts of the said fuel conduit are provided with mutually engagable conical surfaces which are resiliently urged towards one another.

4. An installation comprising an engine bay, a gas turbine engine mounted in the engine bay, a fuel conduit through which fuel may be supplied to the engine, an air conduit communicating with the engine, and fuel supply control means for controlling the amount of fuel passing through the said conduit to the engine, said fuel conduit and said air conduit each being constituted by at least two mutually co-operating parts which are respectively mounted on the engine and in the engine bay, the engagement of the said mutually co-operating conduit parts constituting the sole means for operatively joining said parts when the engine is correctly installed in the engine bay, and said fuel supply control means comprising a linkage which includes two pivoted members which are respectively pivotally mounted on the engine and in the engine bay, the pivoted members contacting each other, when the engine is correctly installed in such a way that pivotal movement of one of the pivoted members causes pivotal movement of the other pivoted member.

5. An installation as claimed in claim 4 in which the said mutually co-operating parts of the said fuel and air conduits are provided with mutually engageable conical surfaces which are resiliently urged towards one another.

6. An installation as claimed in claim 4 in which the said air conduit supplies air to effect starting of the engine turbine.

7. An installation as claimed in claim 4 in which the said air conduit is used in the withdrawal from the engine of air which has been compressed therein.

8. An installation as claimed in claim 4 in which the said air conduit communicates with the downstream end of the engine compressor for taking an air tapping for aircraft control purposes.

9. An installation comprising an engine bay, a gas turbine engine mounted in the engine bay, a fuel conduit through which fuel may be supplied to the engine, an air conduit communicating with the engine, an electrical lead extending to the engine, and fuel supply control means for controlling the amount of fuel passing through the said conduit to the engine, said fuel conduit, air conduit and electrical lead each being constituted by at least two mutually co-operating parts which are respectively mounted on the engine and in the engine bay, the engagement of said mutually co-operating parts constituting the sole means for operatively joining said parts when the engine is correctly installed in the engine bay, and said fuel supply control means comprising a linkage which includes two pivoted members which are respectively pivotally mounted on the engine and in the engine bay, the pivoted members contacting each other, when the engine is correctly installed, in such a way that pivotal movement of one of the pivoted members causes pivotal movement of the other pivoted member.

10. An installation comprising an engine bay, a trunnion mounted in said bay, an engine supported by said trunnion, said trunnion comprising a pin having one end mounted on the engine, a spherical bearing member which is mounted in the engine bay and in which the other end of the pin is received, the spherical bearing member having a plurality of separable parts to permit removal of the pin therefrom, means for guiding the pin and the spherical bearing member towards the said separable parts during the installation of the engine in the engine bay, and means for clamping said separable parts together, a fuel conduit through which fuel may be supplied to the engine, an air conduit communicating with the engine, an electrical lead extending to the engine, and fuel supply control means for controlling the amount of fuel passing through the said conduit to the engine, said fuel and air conduits said electrical lead and said fuel supply control means each being constituted by at least two mutually co-operating parts which are respectively mounted on the engine and in the engine bay, said mutually co-operating parts being automatically brought into operative engagement with each other when the engine is correctly installed in the engine bay.

11. An installation as claimed in claim 10 in which there are two trunnions which are arranged on diametrically opposite sides of the engine, the pins of the two trunnions being mounted within a common yoke member by means of which the enging may be lifted.

12. An installation as claimed in claim 11 in which the front of the engine communicates with an intake member which is pivotally mounted in the engine bay, the intake member being pivotable to a position in which the engine may be removed from the engine bay.

13. An installation as claimed in claim 12 in which the engine has an exhaust duct which is mounted in the engine bay, releasable means being provided for securing the exhaust duct to the remaining part of the engine when the latter has been installed in the engine bay.

14. An aircraft provided with a pod, a plurality of engine bays in said pod, a gas turbine engine which is mounted in each said bay and which extends transversely of the aircraft, means on each engine whereby its jet gases may be selectively directed forwardly, rearwardly or downwardly, each said gas turbine engine having a fuel conduit through which fuel may be supplied to the engine, an air conduit communicating with the engine, an electrical lead extending to the engine, and fuel supply control means for controlling the amount of fuel passing through the said conduit to the engine, said fuel and air conduits, said electrical lead and said fuel supply control means each being constituted by at least two mutually co-operating parts which are respectively mounted on the engine and in the engine bay, said mutually co-operating parts being automatically brought into operative engagement with each other when the engine is correctly installed in the engine bay.

References Cited by the Examiner

UNITED STATES PATENTS

| | | | |
|---|---|---|---|
| 1,581,539 | 4/26 | Kauch et al. | 244—54 |
| 2,471,118 | 5/49 | Peterson | 244—54 |
| 2,516,671 | 7/50 | Bowers et al. | 244—54 |
| 3,028,124 | 4/62 | Sammons | 244—54 |
| 3,066,889 | 12/62 | Kelly | 244—12 |

MILTON BUCHLER, *Primary Examiner.*

ANDREW H. FARRELL, *Examiner.*